United States Patent
Lee et al.

(10) Patent No.: US 7,268,817 B2
(45) Date of Patent: Sep. 11, 2007

(54) METHOD OF AUTOMATICALLY FOCUSING USING A QUADRATIC FUNCTION IN CAMERA

(75) Inventors: Byung-kwon Lee, Seongnam-si (KR); Soon-hac Hong, Seongnam-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 793 days.

(21) Appl. No.: 10/682,681

(22) Filed: Oct. 9, 2003

(65) Prior Publication Data

US 2004/0130650 A1 Jul. 8, 2004

(30) Foreign Application Priority Data

Oct. 9, 2002 (KR) .................. 10-2002-0061489

(51) Int. Cl.
*G03B 13/00* (2006.01)
*H04N 5/232* (2006.01)

(52) U.S. Cl. ........................ 348/355; 348/351
(58) Field of Classification Search ............... 348/354, 348/355, 356

See application file for complete search history.

(56) References Cited

U.S. PATENT DOCUMENTS

| | | | |
|---|---|---|---|
| 5,530,514 A | | 6/1996 | Lisson et al. |
| 6,338,926 B1 * | | 1/2002 | Ku et al. ................ 430/30 |
| 7,071,986 B2 * | | 7/2006 | Kobayashi et al. ......... 348/353 |
| 7,095,443 B2 * | | 8/2006 | Yoshikawa ............... 348/350 |

OTHER PUBLICATIONS

Weisstein, Eric W. "Cramer's Rule." From MathWorld—A Wolfram Web Resource. Accessed Mar. 15, 2007. http://mathworld.wolfram.com/CramersRule.html.*
Weisstein, Eric W. "Quadratic Equation." From MathWorld—A Wolfram Web Resource. Accessed Mar. 15, 2007. http://mathworld.wolfram.com/QuadraticEquation.html.*

* cited by examiner

*Primary Examiner*—Ngoc-Yen Vu
*Assistant Examiner*—Adam L. Henderson
(74) *Attorney, Agent, or Firm*—Drinker Biddle & Reath LLP

(57) ABSTRACT

A method of automatically focusing a camera determines a position of a focus lens where an amount of a high frequency in an image signal is a maximum. The amount of a high frequency included in an image signal is measured at intervals of multiple focus motor steps. Three of the measured positions ($x_1$, $x_2$, $x_3$) and their corresponding measured high frequency amounts ($y_1$, $y_2$, $y_3$) are identified, where $y_2$ is the largest of the measured high frequency amounts, and $x_1$ and $x_3$ are the nearest measured positions on either side of $x_2$. A quadratic function f(x) is determined for the high frequency amount with respect to the focus lens position x. A position at which a derivative $$\frac{df(x)}{dx}$$

of the quadratic function f(x) is zero, is determined to be the position corresponding to maximum high frequency amount. Thus, the driving time of the focus motor can be reduced.

28 Claims, 7 Drawing Sheets

METHOD OF AUTOMATICALLY FOCUSING USING A QUADRATIC FUNCTION IN CAMERA

BACKGROUND OF THE INVENTION

This application claims the priority of Korean Patent Application No. 2002-61489 filed on 9 Oct. 2002 in the Korean Intellectual Property Office, the disclosure of which is incorporated herein in its entirety by reference.

1. Field of the Invention

The present invention relates to a method of automatically focusing in a camera, and more particularly, to a method of automatically focusing by driving a focus motor in the unit of a step, measuring the amount of a high frequency included in an image signal in the unit of a step number, searching for a position step number of the focus motor at a position of a focus lens where the amount of a high frequency is the largest, and searching for and setting the final position step number at which the high frequency amount is the largest around the searched position step number.

2. Description of the Related Art

Referring to FIG. 1, the front surface of a digital camera 1 features a microphone MIC, a self-timer lamp 11, a flash 12, a shutter button 13, a mode dial 14, a function section button 15, a photography information display portion 16, a viewfinder 17a, a function block button 18, a flash light amount sensor (FS) 19, a lens portion 20, and an external interface portion 21.

In a self-timer mode, the self-timer lamp 11 operates during a set time between the pressing of the shutter button 13 and the operation of the shutter. The mode dial 14 allows the user to set one of a variety of modes, for example, a still image photograph mode, a night view photograph mode, a motion picture photograph mode, a play mode, a computer connection mode, and a system set mode. The function selection button 15 allows the user to select one of a variety of operation modes, for example, a still image photograph mode, a night view photograph mode, a motion picture photograph mode, and a play mode. The photography information display portion 16 displays information of each photography-related function. The function block button 18 allows the user to select a function displayed on the photography information display portion 16.

Referring to FIG. 2, the rear surface of a digital camera 1 features a speaker SP, a power button 31, a monitor button 32, an automatic focus lamp 33, a viewfinder 17b, a flash-ready lamp 34, a color LCD panel 35, a confirm/delete button 36, an enter/play button 37, a menu button 38, a wide angle zoom button 39w, a telephoto zoom button 39t, an up movement button 40up, a right movement button 40ri, a down movement button 40do, and a left movement button 40le.

The monitor button 32 allows the user to control the operation of the color LCD panel 35. For example, when the user presses the monitor button 32 once, the LCD panel 35 displays an image of a photographed object and related photography information. When the monitor button 32 is pressed a second time, only the image of the photographed object appears on the color LCD panel 35. When the monitor button 32 is pressed for a third time, power applied to the color LCD panel 35 is turned off. The automatic focus lamp 33 operates when an automatic focusing action is complete. The flash ready lamp 34 operates when the flash 12 of FIG. 1 is in an operation-ready state. The confirm/delete button 36 is used as a confirm button or a delete button in a process wherein the user sets each mode. The enter/play button 37 allows the user to input data or perform a stop/play function in a play mode. The menu button 38 is used to display a menu of a mode selected with the mode dial 14. The up movement button 40up, the right movement button 40ri, the down movement button 40do, and the left movement button 40le are used in the process wherein the user sets each mode.

FIG. 3 shows the structure at an input side of the digital camera 1 of FIG. 1. FIG. 4 shows the entire structure of the digital camera 1 of FIG. 1. Referring to FIGS. 3 and 4, the entire structure of the digital camera 1 is described below.

An optical system OPS includes a lens portion 20 and a filter portion 41, and optically processes light from an object that is photographed. The lens portion 20 of the optical system OPS includes a zoom lens ZL, a focus lens FL, and a compensation lens CL.

When a user presses the wide angle zoom button 39w of FIG. 2 or the telephoto zoom button 39t of FIG. 2 included in a user input portion INP, a corresponding signal is input to a microcontroller 512. Accordingly, the microcontroller 512 controls a lens-driving portion 510, in order to drive a zoom motor $M_Z$ so that the zoom lens $Z_L$ is moved. Thus, when the wide angle zoom button 39w is pressed, the focal length of the zoom lens $Z_L$ is shortened and the angle of view increases. When the telephoto zoom button 39t is pressed, the focal length of the zoom lens $Z_L$ is lengthened and the angle of view decreases. In accordance with these features, the microcontroller 512 ascertains an angel of view with respect to the position of the zoom lens $Z_L$ from design data of the optical system OPS. Because the position of the focus lens FL is adjusted while the zoom lens ZL is in a set position, the angle of view is scarcely affected by the position of the focus lens FL.

When an object is focused, automatically or manually, the present position of the focus lens FL varies according to the present position of the object to be photographed. In an automatic focusing mode, the microcontroller 512 controls the lens-driving portion 510 in order to drive a focus motor $M_F$. Accordingly, the focus motor $M_F$ operates from the foremost side to the rearmost side. In this process, the position of the focus lens FL is set where the amount of a high frequency component in the image signal is highest. The position of the focus lens FL may be determined in accordance with a position step number of the focus motor $M_F$.

The compensation lens CL is not separately driven because it compensates for the overall refractive index.

An aperture driving motor $M_A$ drives an aperture (not shown). The rotation angle of the aperture driving motor $M_A$ varies according to whether it is in the designated exposure mode or not. In the designated exposure mode, the digital camera's exposure amount with respect to the average brightness of a designated detection area displayed on the color LCD panel 35 is set when part of an area of a subject matches the designated detection area.

In the filter portion 41 of the optical system OPS, an optical low-pass filter (OLPF) removes optical noise of high frequency. An infrared cut filter (IRF) blocks the infrared component of incident light.

An optoelectric converting portion (OEC) of a charge coupled device (CCD) or a complementary metal-oxide-semiconductor (CMOS) converts the light captured by the optical system OPS to an electrical analog signal. A digital signal processor (DSP) 507 controls a timing circuit 502 to control the operations of the optoelectric converting portion OEC and a correlation double sampler and analog-to-digital converter (CDS-ADC) device 501. The analog-to-digital conversion portion processes an analog signal output from the optoelectric converting portion OEC, removes high frequency noise, adjusts the amplitude, and converts the analog signal to a digital signal. The DSP 507 processes the digital signal output from the CDS-ADC 501 and generates a digital image signal divided into a luminance signal and a chrominance signal.

A light-emitting portion LAMP driven by the microcontroller 512 includes a self-timer lamp 11, an automatic focus lamp 33 of FIG. 2, and a flash-ready lamp 34 as in FIG. 2. A user input portion INP includes the shutter button 13 of FIG. 1, the mode dial 14 of FIG. 1, the function selection button 15 of FIG. 1, the function block button 18 of FIG. 1, the monitor button 32 of FIG. 2, the confirm/delete button 36 of FIG. 2, the enter/play button 37 of FIG. 2, the menu button 38 of FIG. 2, the wide angle zoom button 39w of FIG. 2, the telephoto zoom button 39t of FIG. 2, the up movement button 40up of FIG. 2, the right movement button 40ri of FIG. 2, the down movement button 40do of FIG. 2, and the left movement button 40le of FIG. 2.

The digital image signal output from the DSP 507 is temporarily stored in a dynamic random access memory (DRAM) 504. An algorithm and set data needed for the operation of the DSP 507 is stored in an electrically erasable programmable read only memory (EEPROM) 505. A removable memory card may be inserted in a memory card interface 506.

The digital image signal output from the DSP 507 is input to an LCD driving portion 514 and an image is displayed on the color LCD panel 35.

The digital image signal output from the DSP 507 can be transmitted in a serial communication through a USB (universal serial bus) connection portion 21a, or an RS232C interface 508 and a connection portion 21b thereof, and through a video filter 509 and a video output portion 21c, as a video signal.

An audio processor 513 outputs a voice signal output from a microphone MIC to the DSP 507 or a speaker SP, or an audio signal output from the DSP 507 to the speaker SP.

The microcontroller 512 controls the operation of the flash controller 511 in order to control the flash 12 according to a signal output from the FS 19.

FIG. 5 shows a photograph control algorithm of the microcontroller 512 of FIG. 4. Referring to FIGS. 1 through 5, a photograph control algorithm of the microcontroller 512 of FIG. 4 is described below. The shutter button 13 included in the INP has a two-step structure. That is, when a user presses the shutter button 13 to the first step after manipulating the wide angle zoom button 39w or telephoto zoom button 39t, a signal S1 from the shutter button 13 is turned on and, when the user presses the shutter button 13 to the second step, a signal S2 from the shutter button 13 is turned on.

The photograph algorithm of FIG. 5 starts when the user presses the shutter button 13 to the first step (Step 701). Here, the present position of the zoom lens ZL is already set.

Next, the remaining capacity of the memory card is checked (Step 702). Then, it is determined whether the remaining capacity of the memory card is sufficient to record a digital image signal (Step 703). If the remaining capacity is not sufficient for recording, a message is displayed, indicating that the capacity of the memory card is insufficient (Step 704). If the remaining capacity is sufficient for recording, the following steps are performed.

First, an automatic white balance (AWB) mode is performed to set related parameters (Step 705). Next, an automatic exposure (AE) mode is performed so that an amount of exposure with respect to incident luminance is calculated. Then, the aperture driving motor $M_A$ is driven according to the calculated exposure amount (Step 706).

Next, an automatic focusing mode (AF) mode is performed, and the present position of the focus lens FL is set (Step 707). The algorithm of the AF setting routine (Step 707) is described later in detail with reference to FIG. 6.

Next, it is determined whether the signal S1 that is a first step signal from the shutter button 13 is in an "ON" state (Step 708). If the signal S1 is not in the "ON" state, since the user does not have an intention to take a photograph, the execution-program is terminated. If the signal S1 is in the "ON" state, the following steps are performed.

First, it is determined whether the signal S2 is in the "ON" state (Step 709). If the signal S2 is not in the "ON" state, since the user does not press the second step of the shutter button 13 to take a photograph, the execution program is moved to Step 706.

If the signal S2 is in the "ON" state, since the user presses the second step of the shutter button 13 to take a photograph, a photographing operation is performed (Step 710). That is, the microcontroller 512 operates the DSP 507 so that the optoelectric converting portion OEC and the CDS-ADC device 501 are operated by the timing circuit 502. Next, image data is compressed (Step 711) and a compressed image file is generated (Step 712). The generated image file is stored in a memory card through the memory card interface 506 from the DSP 507 (Step 713). Then, the performance of the algorithm is terminated.

Referring to FIG. 6, the algorithm of the automatic focus (AF) setting routine (Step 707), includes the first step of moving the focus lens FL to a start position (Step 61) via the focus motor $M_F$. The focus motor $M_F$ is driven incrementally (in units of the "first step number," which consists of a number of steps, for example, an interval of 8 steps) until the position of the focus lens FL reaches the end position. At each incremental position, a focus value, that is, the amount of high frequency included in an image signal, is measured (Steps 62 and 63). The position of the highest focus value out of the measured focus values is checked (Step 64). That is, the step positions proximate to the incremental position having the largest focus value are searched to determine the position of the maximum focus value. Then, the focus lens FL is moved by the focus motor $M_F$ to the position of the maximum focus value (Step 65).

FIG. 7 shows a method of checking the position of the maximum focus value according to an auto focusing method used in a typical digital camera, for example, the model "Digimax 350SE" manufactured by Samsung Techwin Co., Ltd. of Korea. In FIG. 7, the horizontal axis variable, DS, denotes the position step number of the focus motor $M_F$ and the vertical axis variable FV, denotes the focus value, a high frequency amount included in an image signal, respectively. Referring to FIG. 7, after the focus lens FL is moved to the incremental position m of the highest focus value, the focus values are measured at positions (in this case, m−4 and m+4) before and after the position m, at an incremental distance (the "second step number") shorter than the initial incremental distance (the "first step number") of the initial measurements in Step 62. The focus values of the positions are compared and the position with the highest value becomes for the meantime the position of maximum focus value. Lastly, the focus values are measured and compared at positions (in this case, m−2 and m+2) before and after the new position of highest focus value, at a distance less than the previous, second incremental distance (the "second step number"). That is, the position with the highest focus value becomes the position of the final maximum focus value.

According to the above typical automatic focusing method, since the focus values are directly measured at decreasing intervals around the position m of the initially measured maximum focus value, the operation time of automatic focusing increases with the number of measurements that are taken.

SUMMARY OF THE INVENTION

To solve the above and/or other problems, the present invention provides an automatic focusing method, which can reduce the operation time of automatic focusing in a camera.

According to an aspect of the present invention, a method of automatically focusing a camera determines a position of a focus lens where an amount of a high frequency in an image signal is a maximum. The amount of a high frequency included in an image signal is measured at intervals of multiple focus motor steps. Three of the measured positions ($x_1$, $x_2$, $x_3$) and their corresponding measured high frequency amounts ($y_1$, $y_2$, $y_3$) are identified, where $y_2$ is the largest of the measured high frequency amounts, and $x_1$ and $x_3$ are the nearest measured positions on either side of $x_2$. A quadratic function f(x) is determined for the high frequency amount with respect to the focus lens position x. A position at which a derivative $$\frac{df(x)}{dx}$$

of the quadratic function f(x) is zero, is determined to be the position corresponding to maximum high frequency amount. Thus, the driving time of the focus motor can be reduced.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 8:
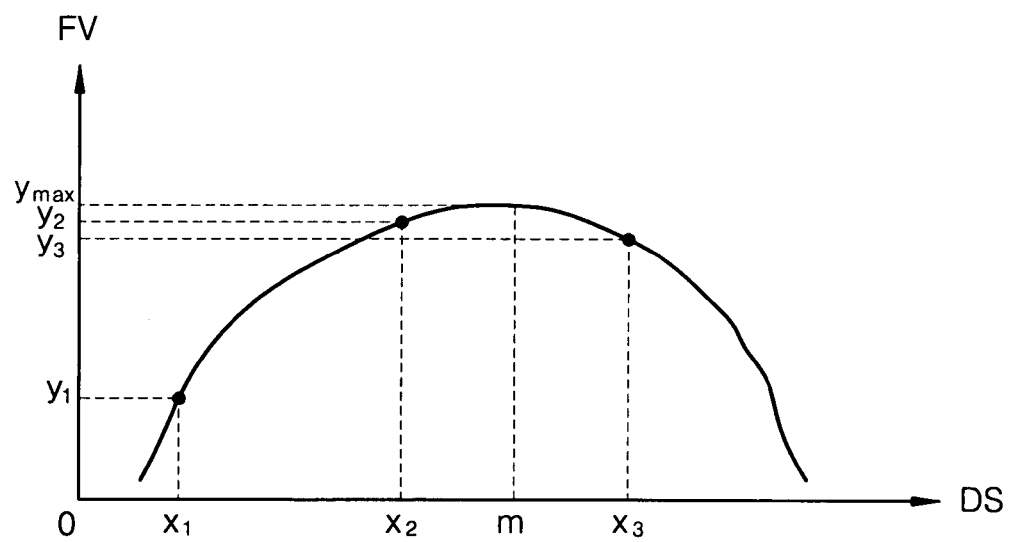
FIG. 8 is a graph showing a method of checking the position of the maximum focus value in an automatic focusing method according to the present invention.
Figure 9:
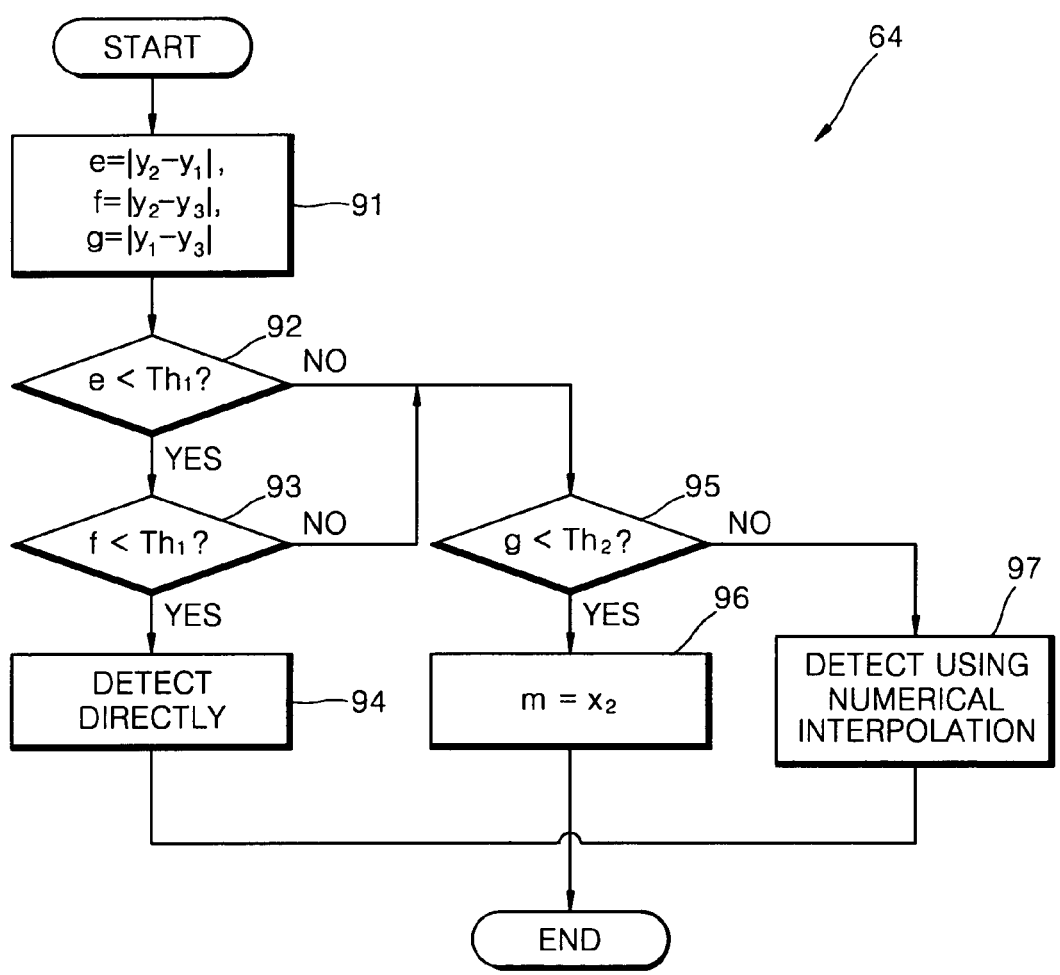
FIG. 9 is a flow chart showing an algorithm to check a position of the maximum focus value in the automatic focusing method according to the present invention.

The above descriptions to FIGS. 1 through 6 are applied to a preferred embodiment of the present invention. FIG. 8 is a graph showing a method of checking the position of the maximum focus value in an automatic focusing method according to the present invention. In FIG. 8, the horizontal axis variable DS denotes a position step number of the focus motor, and the vertical axis quantity FV denotes a focus value, that is, the amount of a high frequency included in an image signal. FIG. 9 is a flow chart showing an algorithm for checking the position step number of the maximum focus value according to the automatic focusing method of the present invention.

Figure 1:
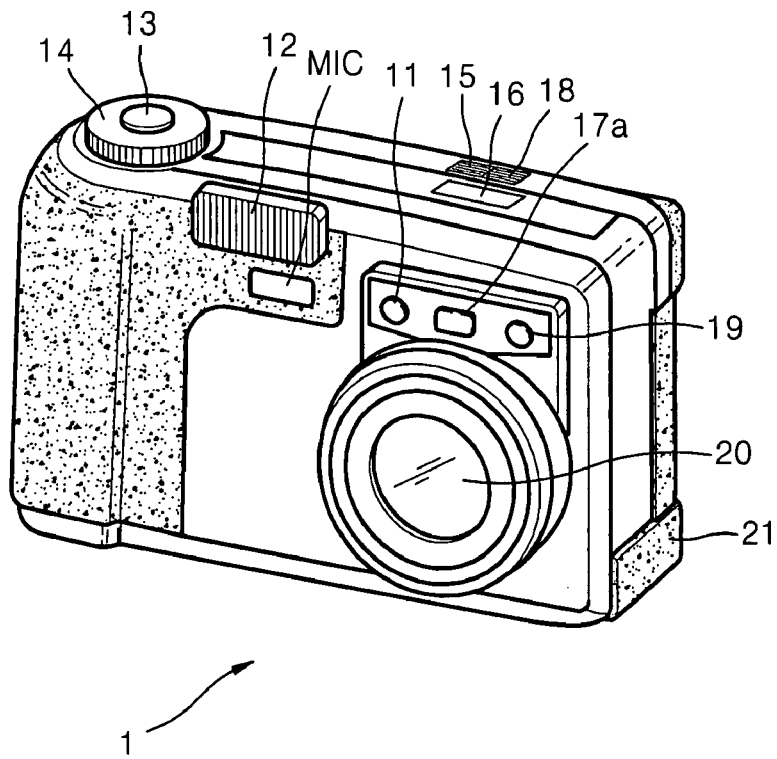
FIG. 1 is a perspective view illustrating the front side of a digital camera.
Figure 2:
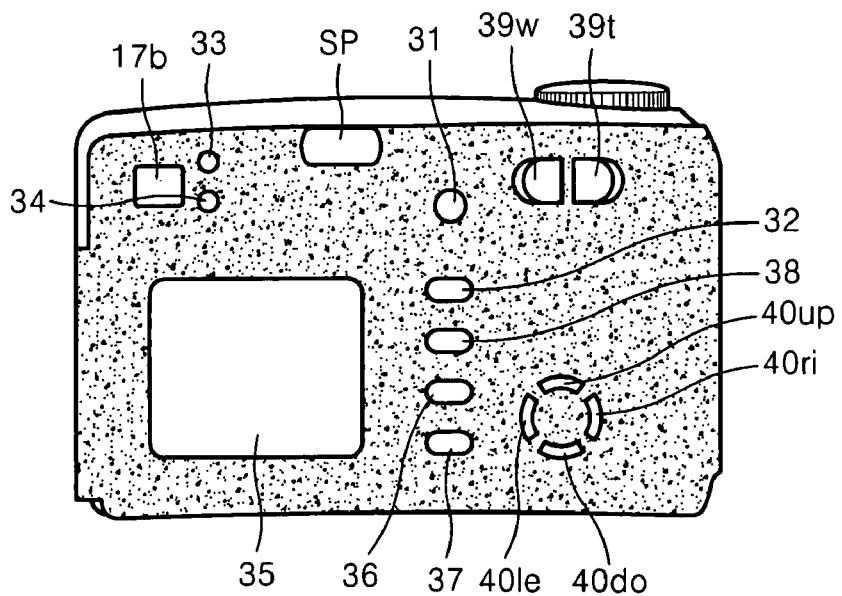
FIG. 2 is a rear view illustrating the rear side of the digital camera of FIG. 1.
Figure 3:
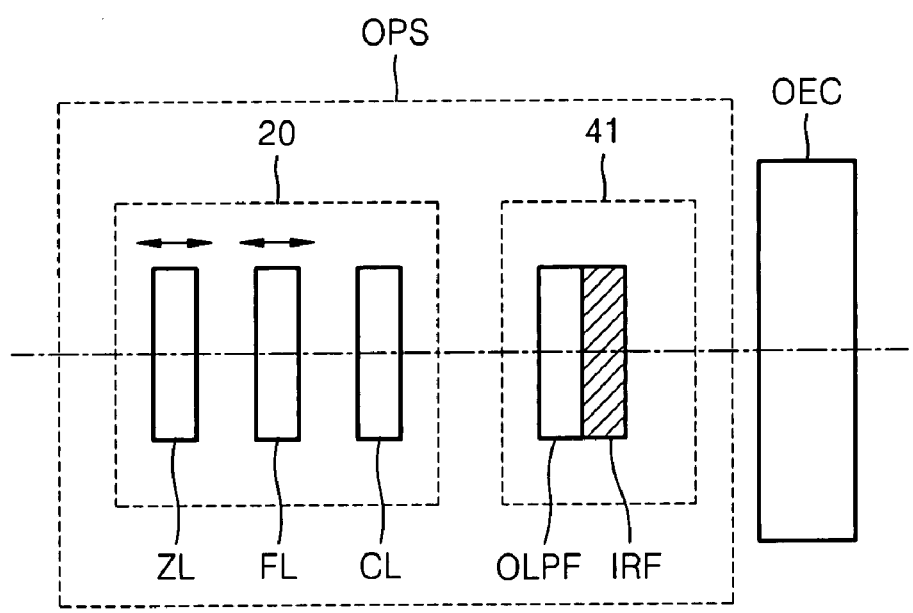
FIG. 3 is a view illustrating the structure of the input side of the digital camera of FIG. 1.
Figure 4:
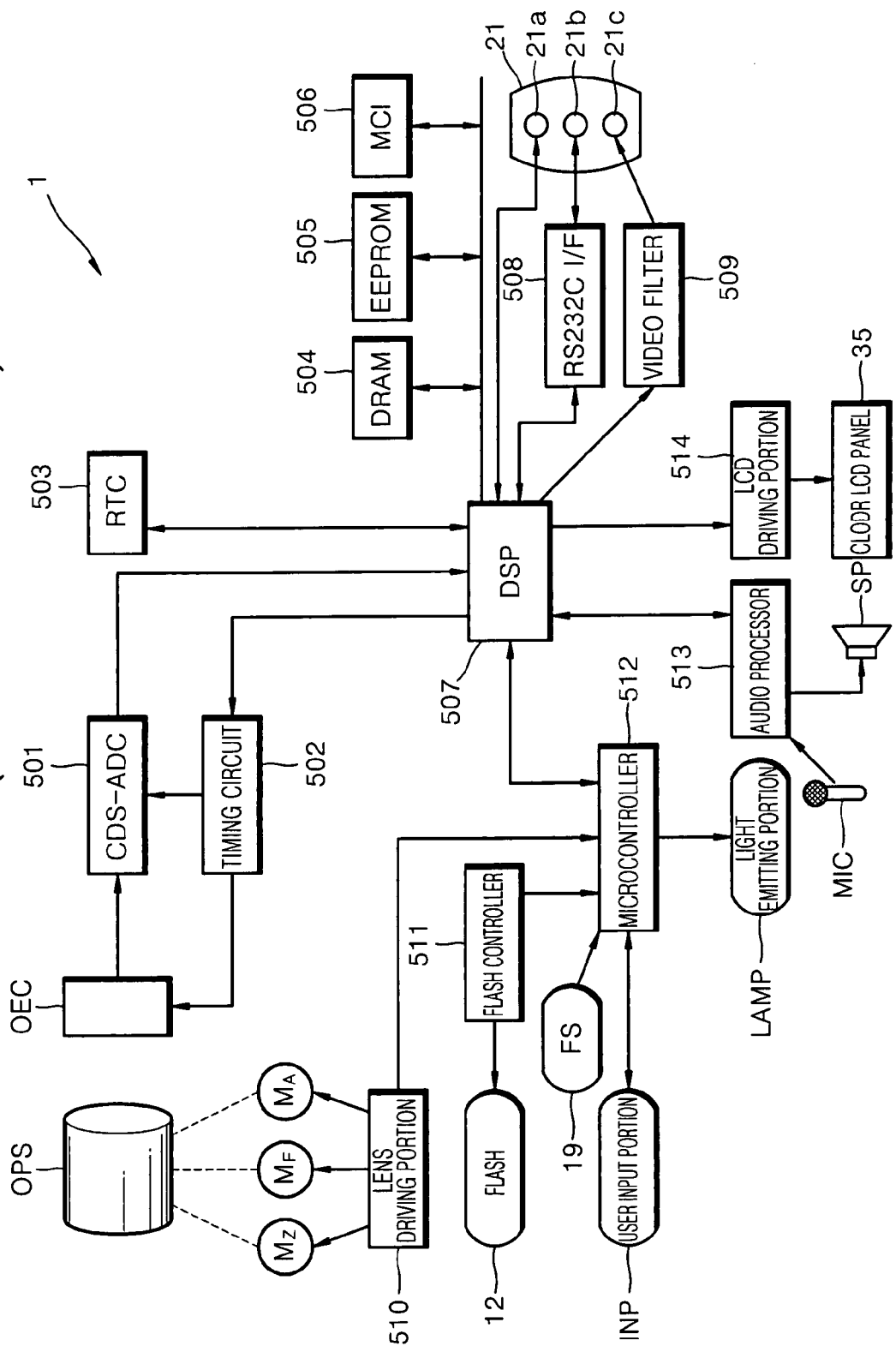
FIG. 4 is a block diagram illustrating the overall structure of the digital camera of FIG. 1.
Figure 5:
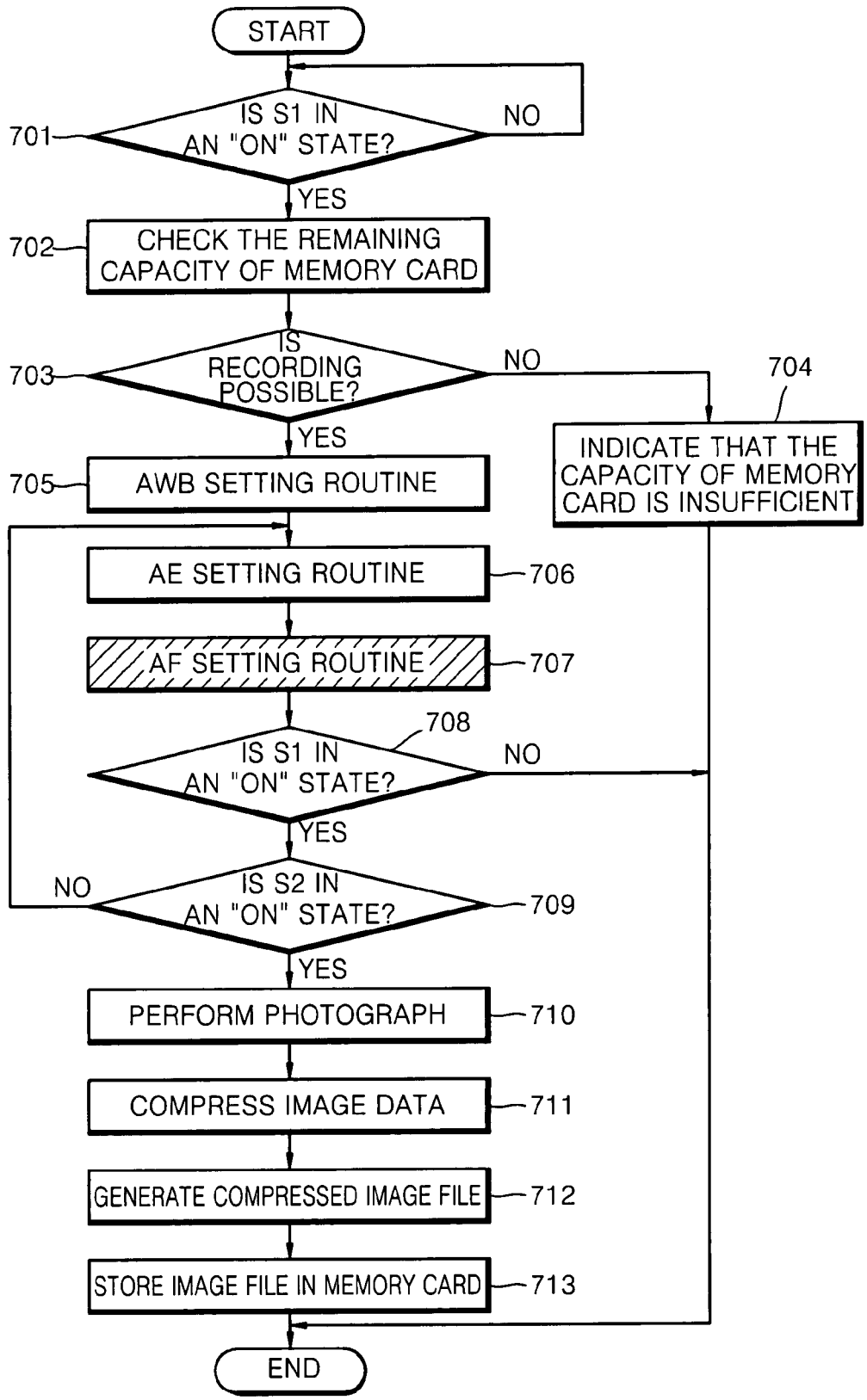
FIG. 5 is a flow chart showing the photograph control algorithm of the microcontroller of FIG. 4
Figure 6:
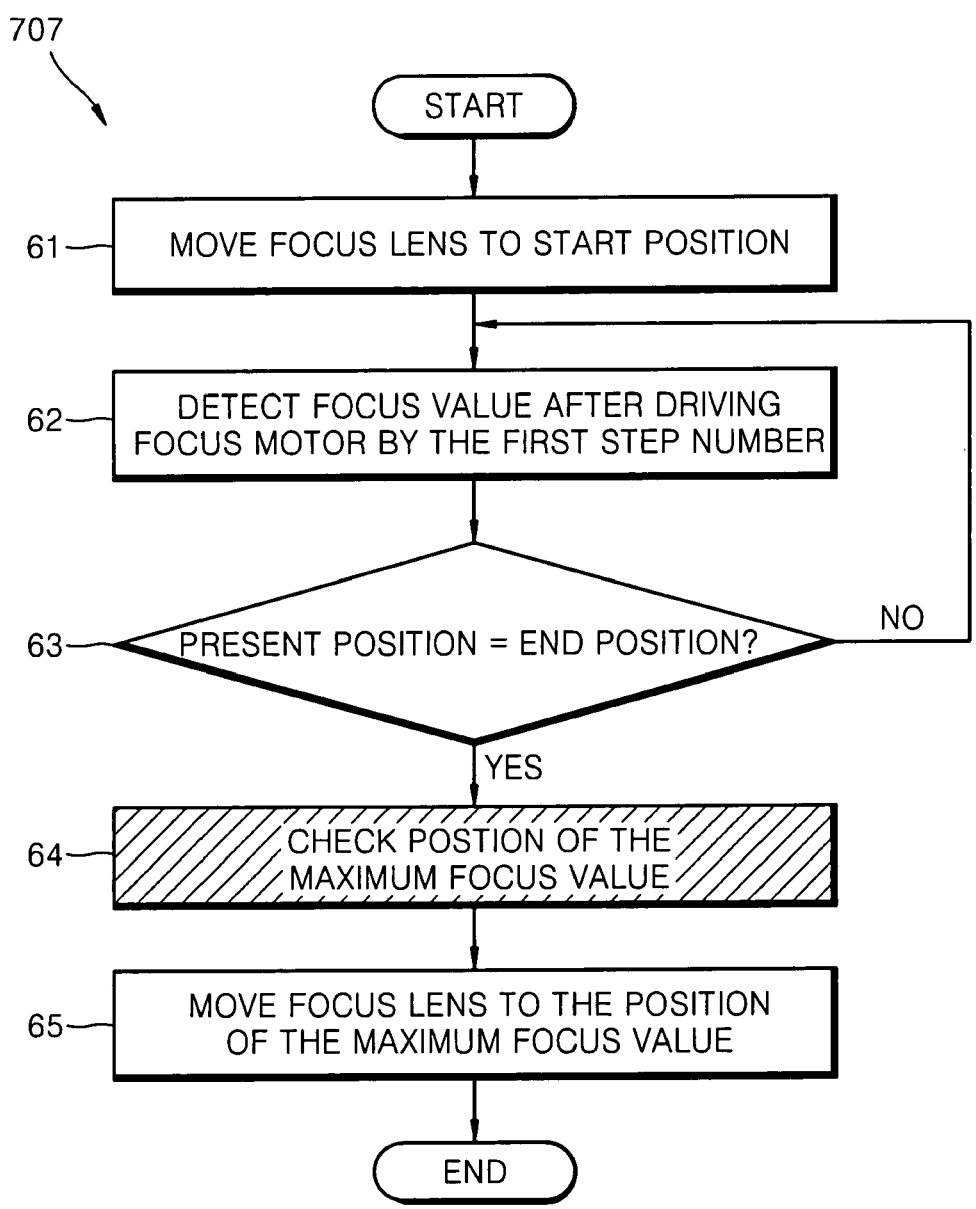
FIG. 6 is a flow chart showing the algorithm of the automatic focus (AF) setting routine of FIG. 5.

In the method of the present invention, the focus value, that is, the amount of high frequency included in an image signal, is initially measured at regular intervals between and including a start position and an end position, as shown in FIG. 6.

These intervals consist of a number of steps, as the focus motor $M_F$ is driven incrementally in steps.

Referring to FIG. 8, the measurements ($y_1$, $y_2$, and $y_3$) of a high frequency in an image signal are considered at a number of positions, for example, three ($x_1$, $x_2$, $x_3$) out of the measurement positions taken initially. The intervals are equivalent to the "first step number," and in the case of three positions would equal $x_2-x_1$ and $x_3-x_2$. The second position step number $x_2$ is the position of the focus lens where the amount of a high frequency is initially measured the largest. At this point, a step of searching for and detecting the final position step number m of the maximum focus value, is needed. The method of the current invention provides an improved method for determining the position m of the maximum focus value and is described below.

First, the method determines a first differential value, $e=|y_2-y_1|$, that is the absolute value of the difference between the high frequency amount $y_2$ at the second position step number $x_2$ and the high frequency amount $y_1$ at the first position step number $x_1$, a second differential value, $f=|y_2-y_3|$, that is the absolute value of the difference between the high frequency amount $y_2$ at the second position step number $x_2$ and the high frequency amount $y_3$ at the third position step number $x_3$, and a third differential value, $g=|y_3-y_1|$, that is the absolute value of the difference between the high frequency amount $y_1$ at the first position step number $x_1$ and the high frequency amount $y_3$ at the third position step number $x_3$ (Step 91).

Figure 7:
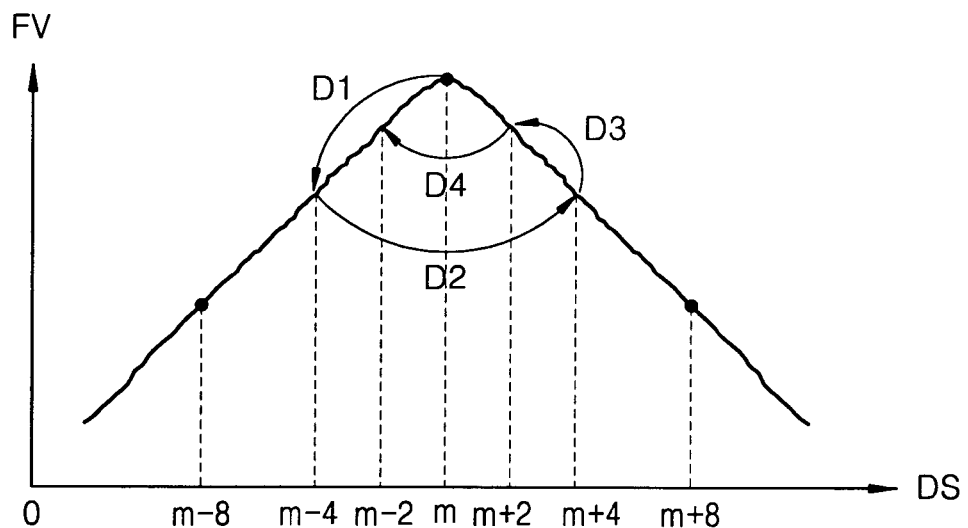
FIG. 7 is a graph showing a method of checking the position of the maximum focus value in the typical automatic focusing method.

Next, when both the first differential value e and the second differential value f are smaller than the first lowest limit value $Th_1$, the focus motor $M_F$ is driven so that a measurement is taken of a high frequency amount at each of the position step numbers between the first position step number $x_1$ and the third position step number $x_3$. The position step number at which the high frequency is measured the highest is set as the position of maximum focus value. (Steps 92, 93, and 94). Thus, Step 94 may use the method of FIG. 7. This occurs because if the first differential value e and the second differential value f are smaller than the first lowest limit value $Th_1$, checking by a numerical interpolation using a quadratic function is not possible.

Next, if either the first differential value e or the second differential value f is equal to or larger than the first lowest limit value $Th_1$, the third differential value g is compared with the second lowest limit value $Th_2$ (Steps 92, 93, and 95).

If the third differential value g is smaller than the second lowest limit value $Th_2$, the second position step number $x_2$ is set as the final position step number m (Step 96). This is because, if the third differential value g is smaller than the second lowest limit value $Th_2$, a characteristic curve between the first position step number $x_1$ and the third position step number $x_3$ becomes nearly linear.

When the third differential value g is equal to or larger than the second lowest limit value $Th_2$, a quadratic function f(x) for a high frequency amount at the position step number x is obtained from the first position step number $x_1$ to the third position step number $x_3$. The final position step number m of maximum focus value is set at the position step number where a derivative df(x)/dx of the quadratic function f(x) is zero (Step 97). The detection method using numerical interpolation employing a quadratic function is described below.

The quadratic function f(x) for a high frequency amount at the position step number x from the first position step number $x_1$ to the third position step number $x_3$ is shown in the following Equation 1.

$$f(x) = a + bx + cx^2 \quad \text{[Equation 1]}$$

Here, a, b, and c indicate unknown constants. According to the following Equations 2 through 4, the constants can be obtained by substituting data $(x_1, y_1)$, $(x_2, y_2)$, and $(x_3, y_3)$, for the three points.

$$Y = XA \quad \text{[Equation 2]}$$

$$Y = \begin{vmatrix} y_1 \\ y_2 \\ y_3 \end{vmatrix} \quad \text{[Equation 3A]}$$

$$X = \begin{vmatrix} 1 & x_1 & x_1^2 \\ 2 & x_2 & x_2^2 \\ 3 & x_3 & x_3^2 \end{vmatrix} \quad \text{[Equation 3B]}$$

$$A = \begin{vmatrix} a \\ b \\ c \end{vmatrix} \quad \text{[Equation 3C]}$$

$$A = X^{-1} Y \quad \text{[Equation 4]}$$

In Equation 4, $X^{-1}$ denotes an inverse matrix of X.

Thus, when the constants a, b, and c are obtained from the Equations 2 through 4, Equation 1 is completed. The final position step number m is set at the position step number x value at which the derivative df(x)/dx of the quadratic function f(x) is zero. That is, the final position step number m can be set according to the following Equations 5A through 5B.

$$\frac{df(x)}{dx} = 2cx + b = 0 \quad \text{[Equation 5A]}$$

$$m = -\frac{b}{2c} \quad \text{[Equation 5B]}$$

According to the Cramer's rule, the unknown constants a, b, and c can be obtained from the following Equations 6A through 6C.

$$a = \frac{|X_1|}{|X|} \quad \text{[Equation 6A]}$$

$$b = \frac{|X_2|}{|X|} \quad \text{[Equation 6B]}$$

$$c = \frac{|X_3|}{|X|} \quad \text{[Equation 6C]}$$

In the above Equations 6A through 6C, $|X_1|$ is a matrix formula in which the first column of $|X|$ is replaced by Y, $|X_2|$ is a matrix formula in which the second column of $|X|$ is replaced by Y, and $|X_3|$ is a matrix formula in which the third column of $|X|$ is replayed by Y. That is, $|X_1|$, $|X_2|$, and $|X_3|$ can be obtained from the following Equations 7A through 7C.

$$|X_1| = \begin{vmatrix} y_1 & x_1 & x_1^2 \\ y_2 & x_2 & x_2^2 \\ y_3 & x_3 & x_3^2 \end{vmatrix} \quad \text{[Equation 7A]}$$

$$|X_2| = \begin{vmatrix} 1 & y_1 & x_1^2 \\ 1 & y_2 & x_2^2 \\ 1 & y_3 & x_3^2 \end{vmatrix} \quad \text{[Equation 7B]}$$

$$|X_3| = \begin{vmatrix} 1 & x_1 & y_1 \\ 1 & x_2 & y_2 \\ 1 & x_3 & y_3 \end{vmatrix} \quad \text{[Equation 7C]}$$

Thus, when the Cramer's rule is used, Equation 5B is the same as the following Equation 8. The final position step number m can be determined from Equation 8.

$$m = -\frac{\begin{vmatrix} 1 & y_1 & x_1^2 \\ 1 & y_2 & x_2^2 \\ 1 & y_3 & x_3^2 \end{vmatrix}}{2 \begin{vmatrix} 1 & x_1 & y_1 \\ 1 & x_2 & y_2 \\ 1 & x_3 & y_3 \end{vmatrix}} \quad \text{[Equation 8]}$$

While this invention has been particularly shown and described with reference to preferred embodiments thereof, it will be understood by those skilled in the art that various changes in form and details may be made therein without departing from the spirit and scope of the invention.

What is claimed is:

1. A method of automatically focusing a camera, comprising the steps of:
   measuring a high frequency amount in an image signal according to a position of a focus lens at three or more positions;
   identifying at least three positions, $x_1$, $x_2$, and $x_3$ along with their corresponding high frequency amounts $y_1$, $y_2$, and $y_3$; respectively;
   determining an absolute value of a difference between $y_2$ and $y_1$;
   determining an absolute value of a difference between $y_1$ and $y_3$; and
   if the absolute value of the difference between $y_2$ and $y_1$ is not less than a first threshold value, and if the absolute value of the difference between $y_1$ and $y_3$ is not less than a second threshold value, then proceeding with the steps of determining a quadratic function f(x) where f(x) is a high frequency amount in the image signal and x is a position of the focus lens, and determining a position where a derivative $$\frac{df(x)}{dx}$$

of the quadratic function f(x) is equal to zero corresponding to largest amount of high frequency.

2. The method of claim 1 wherein the quadratic function is of the form, $$f(x)+a+bx=cx^2,$$

where a, b, and c are constants.

3. The method of claim 2, where the step of determining the position corresponding to the largest amount of high frequency further comprises:
setting m=(−b)/2c, where m is the position of the focus lens corresponding to the largest high frequency amount.

4. The method of claim 2, wherein the step of determining the quadratic function f(x) further comprises:
determining values of the constants.

5. The method of claim 1 wherein $y_2$ is the highest measured frequency amount out of the three or more amounts measured.

6. The method of claim 1 wherein $x_1$ and $x_3$ are measured positions before and after $x_2$.

7. The method of claim 1 wherein, out of the three or more positions at which the high frequency amount is measured, $x_1$ and $x_3$ are the measured positions that are closest before and after $x_2$.

8. The method of claim 1 wherein the three or more measured positions are spaced apart at equal intervals.

9. The method of claim 1, further comprising the steps of:
determining an absolute value of a difference between $y_2$ and $y_3$; and
if both the absolute value of the difference between $y_2$ and $y_1$ is less than a first threshold value, and the absolute value of the difference between $y_2$ and $y_3$ is less than a first threshold value,
then determining a position corresponding to largest amount of high frequency by direct measurement and skipping the step of determining a quadratic function f(x).

10. The method of claim 1 wherein the quadratic function is an approximation.

11. The method of claim 1 wherein the position corresponding to the largest amount of high frequency in an image signal is an approximation.

12. The method of claim 1 wherein the position of the focus lens is an integer multiple of a step unit.

13. A method of automatically focusing a camera, comprising the steps of:
measuring a high frequency amount in an image signal according to a position of a focus lens at three or more positions;
identifying at least three positions, $x_1$, $x_2$, and $x_3$ along with their corresponding high frequency amounts $y_1$, $y_2$, and $y_3$; respectively;
determining an absolute value of a difference between $y_2$ and $y_3$;

determining an absolute value of a difference between $y_1$ and $y_3$; and
if the absolute value of the difference between $y_2$ and $y_3$ is not less than a first threshold value, and if the absolute value of the difference between $y_1$ and $y_3$ is not less than a second threshold value, then proceeding with the steps of determining a quadratic function f(x) where f(x) is a high frequency amount in the image signal and x is a position of the focus lens, and determining a position where a derivative $$\frac{df(x)}{dx}$$

of the quadratic function f(x) is equal to zero corresponding to largest amount of high frequency.

14. The method of claim 13 wherein the quadratic function is of the form, $$f(x)=a+bx+cx^2,$$

where a, b, and c are constants.

15. The method of claim 14 where the step of determining the position corresponding to the largest amount of high frequency further comprises:
setting m=(−b)/2c, where m is the position of the focus lens corresponding to the largest high frequency amount.

16. The method of claim 14, wherein the step of determining the quadratic function f(x) further comprises:
determining values of the constants.

17. The method of claim 13 wherein $y_2$ is the highest measured frequency amount out of the three or more amounts measured.

18. The method of claim 13 wherein $x_1$ and $x_3$ are measured positions before and after $x_2$.

19. The method of claim 13 wherein, out of the three or more positions at which the high frequency amount is measured, $x_1$ and $x_3$ are the measured positions that are closest before and after $x_2$.

20. The method of claim 13 wherein the three or more measured positions are spaced apart at equal intervals.

21. The method of claim 13 wherein the quadratic function is an approximation.

22. The method of claim 13 wherein the position corresponding to the largest amount of high frequency in an image signal is an approximation.

23. The method of claim 13 wherein the position of the focus lens is an integer multiple of a step unit.

24. A method automatically focusing a camera, comprising the steps of:
measuring a high frequency amount in an image signal according to a position of a focus lens at three or more positions;
identifying at least three positions, $x_1$, $x_2$, and $x_3$ along with their corresponding high frequency amounts $y_1$, $y_2$, and $y_3$; respectively;
determining an absolute value of a difference between $y_2$ and $y_1$;
determining an absolute value of a difference between $y_2$ and $y_3$;
determining an absolute value of a difference between $y_1$ and $y_3$; and
if either the absolute value of the difference between $y_2$ and $y_1$ is not less than a first threshold value, or the absolute value of the difference between $y_2$ and $y_3$ is not less than a first threshold value, and if the absolute value of the difference between $y_1$ and $y_3$ is less than a second threshold value, then setting $x_2$ as a position corresponding to largest amount of high frequency.

25. The method of claim 24 wherein $y_2$ is the highest measured frequency amount out of the three or more amounts measured.

26. The method of claim 24 wherein $x_1$ and $x_3$ are measured positions before and after $x_2$.

27. The method of claim 24 wherein, out of the three or more positions at which the high frequency amount is measured, $x_1$ and $x_3$ are the measured positions that are closest before and after $x_2$.

28. The method of claim 24 wherein the three or more measured positions are spaced apart at equal intervals.

* * * * *